US 9,284,026 B2

(12) United States Patent
Harrell

(10) Patent No.: US 9,284,026 B2
(45) Date of Patent: Mar. 15, 2016

(54) ASSEMBLY FOR TRANSPORTING A BOAT LIFT

(71) Applicant: Douglas Todd Harrell, Belding, MI (US)

(72) Inventor: Douglas Todd Harrell, Belding, MI (US)

(*) Notice: Subject to any disclaimer, the term of this patent is extended or adjusted under 35 U.S.C. 154(b) by 0 days.

(21) Appl. No.: 14/591,635

(22) Filed: Jan. 7, 2015

(65) Prior Publication Data
US 2015/0197317 A1    Jul. 16, 2015

Related U.S. Application Data

(60) Provisional application No. 61/925,854, filed on Jan. 10, 2014.

(51) Int. Cl.
*B63B 27/16* (2006.01)
*B60F 3/00* (2006.01)
*B63C 3/06* (2006.01)
*B63B 35/00* (2006.01)

(52) U.S. Cl.
CPC ............... *B63B 27/16* (2013.01); *B60F 3/0092* (2013.01); *B63B 35/003* (2013.01); *B63C 3/06* (2013.01)

(58) Field of Classification Search
CPC ........ B63B 27/16; B63B 27/30; B60P 3/1033
USPC ........................................... 114/44, 248, 249
See application file for complete search history.

(56) References Cited

U.S. PATENT DOCUMENTS

| | | | | |
|---|---|---|---|---|
| 3,276,211 A * | 10/1966 | Drake | ........................ | B63C 1/02 114/45 |
| 5,687,663 A * | 11/1997 | Wahlstrand | ............... | B63C 3/12 114/44 |
| 5,915,877 A * | 6/1999 | Sargent | .................... | B66F 7/025 114/44 |
| 6,152,065 A * | 11/2000 | Gronstrand | ............. | B63B 23/30 114/258 |
| 6,470,816 B1 * | 10/2002 | Golden | ..................... | B63C 3/06 114/44 |
| 6,918,345 B2 * | 7/2005 | Golden | ..................... | B66F 7/02 114/44 |
| 7,066,683 B2 * | 6/2006 | Way | .......................... | B63C 3/12 254/336 |
| 7,338,231 B2 * | 3/2008 | Masters | .................... | B63C 3/06 405/3 |
| 7,407,150 B1 * | 8/2008 | Bellantoni | ............... | B66D 1/26 254/285 |
| 8,267,620 B2 * | 9/2012 | Wood, II | .................. | B63C 3/06 114/230.23 |
| 8,944,413 B1 * | 2/2015 | Hatch | ....................... | B66D 1/12 254/323 |
| 8,979,426 B2 * | 3/2015 | Doig | ......................... | B63C 3/06 114/44 |
| 2004/0089212 A1 * | 5/2004 | Vinnik | ...................... | B63C 1/02 114/44 |
| 2013/0004238 A1 * | 1/2013 | Doig | ......................... | B63C 3/06 405/3 |
| 2015/0197317 A1 * | 7/2015 | Harrell | .................... | B63B 27/16 114/344 |

OTHER PUBLICATIONS

Shorestation literature SSV50108 Parts Drawing.
Shorestation Boat Hoist Literature.
Jan. 15, 2013 Wakeworld literature.

* cited by examiner

*Primary Examiner* — Lars A Olson
*Assistant Examiner* — Jovon Hayes
(74) *Attorney, Agent, or Firm* — Barry C. Kane; Kane & Co., PLC

(57) ABSTRACT

A boat lift transport device is disclosed for moving a boat lift in and out of the water. The transport device includes a floating platform depending from which are a plurality of booms, beams, or crane arms that extend outboard of the platform. Cables extending along and from the ends of the crane arms are attachable to the boat lift and can be reeled in or paid out by way of winch to move the boat lift between a suspended position and a lowered and resting position.

20 Claims, 4 Drawing Sheets

ASSEMBLY FOR TRANSPORTING A BOAT LIFT

CROSS REFERENCE TO RELATED APPLICATIONS

This application is a new non-provisional application claiming the benefit of the filing date of U.S. Provisional Patent Application Ser. No. 61/925,854 filed Jan. 10, 2014, the contents of which are incorporated herein by reference. The inventor in both applications is the same.

STATEMENT REGARDING FEDERALLY SPONSORED RESEARCH

The invention described and claimed herein was not conceived or developed with the aid or assistance of any federally sponsored research or development programs.

BACKGROUND OF THE INVENTION

1. Field of the Invention

This invention relates to floatation devices, and particularly to a device for installing, transporting, and uninstalling water craft lift stations.

2. Background of the Relevant Art

Boat lifts have been around for many years to raise and lower water craft relative to the water line. Such lifts/stations are positioned in the water in the appropriate location to allow the water craft to float over the cradle when in the lowered position, and to raise the water craft out of the water when in the elevated position. The lift station helps stabilize the craft while it is in the water, and helps protect the craft from wave action and reduce the accumulation of biological fauna on the hull when out of the water.

In adverse weather conditions such as winter and other stormy situations, the boat lifts/stations are removed from the water for storage on shore. Most boat lifts/stations rest on pads to prevent subsidence. In some cases, the stations are pulled from the water by dragging which can result in stress on the structure. The recommended procedure for installing and uninstalling the station is through the use of manpower to lift the station in and out of position. However, there are many instances where the use has insufficient manpower to move the lift, or the terrain makes it extremely difficult to transport the shore station onto land. These instances present risk of injury to both person and to property.

The invention described and claimed herein makes it easier to transport the boat lift/station from an easily accessed point such as a boat launch, and then place the shore station at an acceptable location somewhere remote from the boat launch.

SUMMARY OF THE INVENTION

The invention described and claimed herein is an assembly for transporting a boat lift in and out of a body of water. The assembly includes at least one float, a plurality of cranes or outriggers disposed on the float and extending laterally outboard of the float, a plurality of cables or other lines extending along each of the cranes, each having an end attachable to the boat lift and an opposite end attached to a reel; and an assembly for actuating the reel to pay-out and reel-in the cables along the cranes. The cranes on the float are supported by a frame mounted to an upper surface of the float The resultant vertical force exerted on the float by the body of water is greater than the sum of the masses of the boat lift plus the water displaced by the float so as to cause the boat lift to be supported by the float. When floating, the assembly may be used to transport the boat lift to a location where it is received on a trailer and removed from the water.

According to one vision of the invention, the float may be one of a barge, blocks of polystyrene, a plurality of pontoons, and a plurality of interconnected cylinders. The cranes may be disposed fore and aft along the float.

In accordance with another form of the invention, the assembly for transporting a boat lift may be comprised of a buoyant platform, a plurality of beams disposed upon and cantilevered outboard from the platform, at least one reel mounted on the platform, a plurality of cables, each extending along one of the beams and having one end attachable to the boat lift and an opposite end attached to the reel. A mechanism such as a winch or ratchet may be used for actuating the reel to wind and unwind the cable to raise and lower the boat lift. The platform may be comprised of one of a barge, a plurality of pontoons, a plurality of water-tight canisters interconnected to one another; polystyrene blocks; and a boat hull. The invention may also include a trailer for receiving the buoyant platform where the trailer is used to move the boat lift in and out of the water and overland to and from a suitable storage location.

In accordance with another embodiment of the invention, pulleys disposed on the beams may be utilized in association with the cable to reduce friction and increase the forces for raising the boat lift. The cable may be paid in and out and stored on one or more reels mounted on a shaft interconnected to the mechanism for actuating the reels. A frame assembly may be provided interconnecting the plurality of beams to the buoyant platform. Moreover, it is contemplated that the beams may be moveable in translation longitudinally along the buoyant platform to provide adjustments and flexibility in adapting to boat lifts of various sizes.

The advantages offered by the instant invention over what was done previously is that the invention is compact, lightweight, easy to transport, and stabile. Moreover, the construction is rather straight forward and uncomplicated, keeping the cost down.

BRIEF DESCRIPTION OF THE SEVERAL VIEWS OF THE DRAWINGS

The above advantages and other features and objects of the present invention will be further understood and appreciated by those skilled in the art by reference to the following specification, claims and appended drawings, wherein

DETAILED DESCRIPTION OF THE INVENTION

Figure 2:
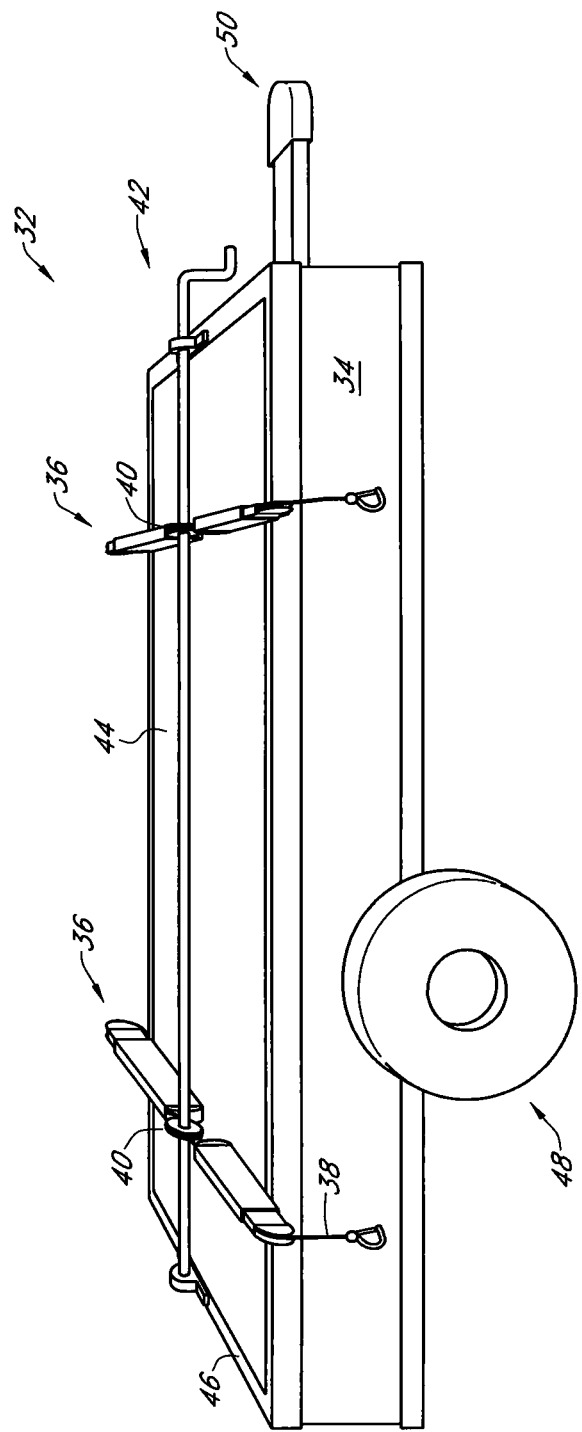
FIG. 2 is an oblique view of one embodiment of the instant invention.

For purposes of the following description, the terms "upper," "lower," "left," "rear," "front," "vertical," "horizontal" and derivatives of such terms such as "fore" and "aft" shall relate to the invention as oriented in FIG. 2. However, it is to be understood that the invention may assume various alternative orientations and configuration, except where expressly specified to the contrary. It is also to be understood that the devices and processes illustrated in the attached drawings, and described in the following specification are simply exemplary embodiments of the inventive concepts defined in the inventive concepts of this invention. Specific dimensions and other physical characteristics relating to the embodiments disclosed herein are not to be considered as limiting unless expressly stated otherwise.

Figure 1:
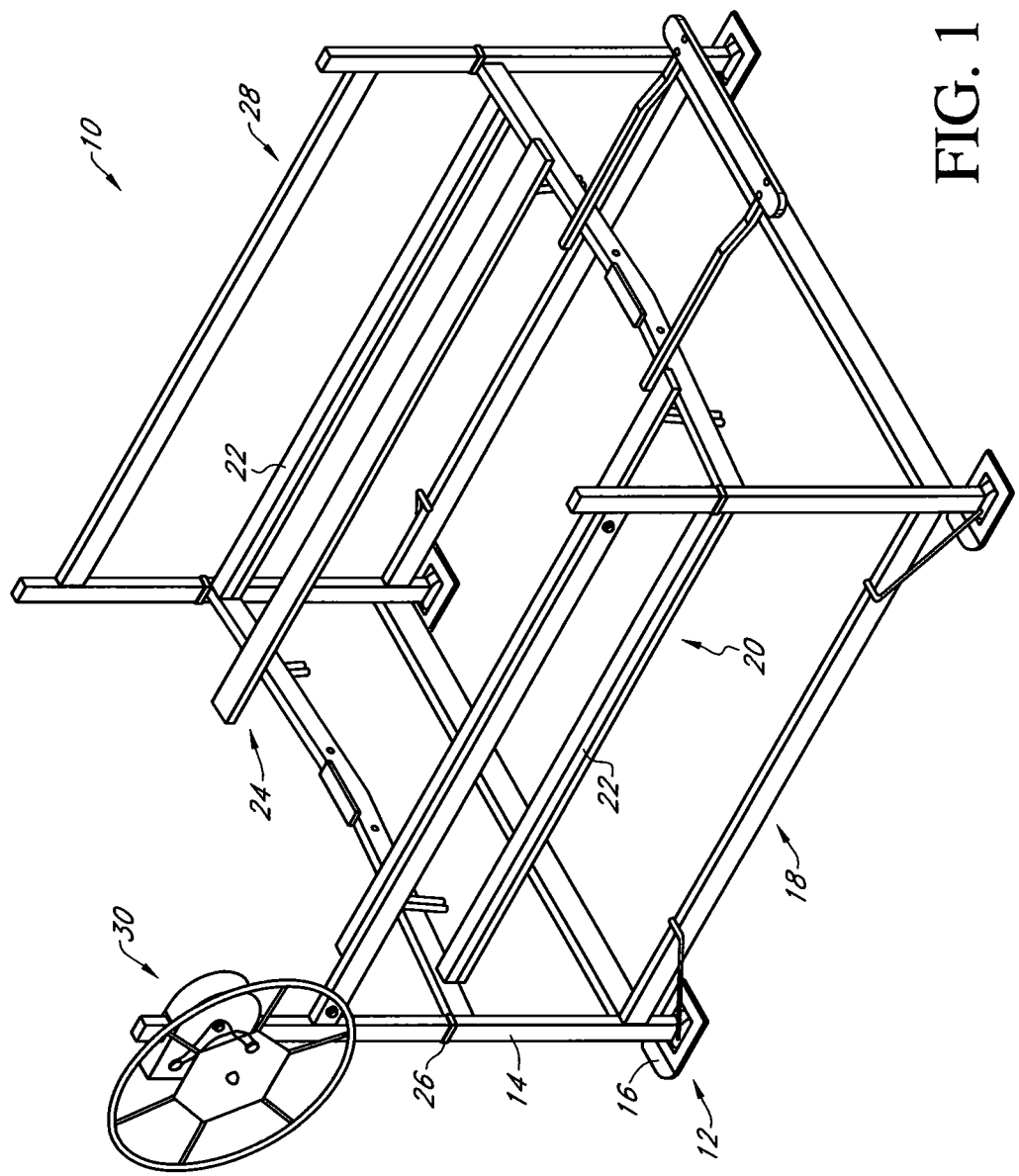
FIG. 1 is schematic illustration of a generic shore station.

Boat lifts, also known as shore stations, are machines that are used to lift a boat or other water craft from the water. The primary benefit of a boat lift is that it temporarily removes the craft from the water which reduces wear and corrosion on the vehicle. The boat lift also provides access to the hull of the craft to allow cleaning and painting and other maintenance without having to take the boat to a repair/service facility. A boat lift keeps the boat elevated and out of the water when not in use, avoiding the abuse that occurs from constant wind and wave action. One example of such a boat lift 10 is shown in FIG. 1.

The boat lift 10 is essentially a frame structure that rests on the bed of the lake, river, or ocean and extends above the water surface. As shown in FIG. 1, a typical boat lift includes a base pad assembly 12 including posts 14 and pads 16. Often the pad assemblies 12 include extensions that telescope relative to the posts 14 to allow stable positioning of the boat lift on the earth below the surface of the water. Interconnecting and supporting the posts 14 is a lower frame assembly 18. The lower frame assembly 18 includes a plurality of beams or rails interconnecting the posts at a point proximate the pads 16 yet high enough to avoid obstructions on the bed.

Disposed above the lower frame assembly 18 is a cradle assembly 20 formed by a plurality of rails 22 interconnected together at their corners and adapted to move up and down the corners posts 14. The cradle assembly 20 is free to move as far down as the lower frame assembly 18 and up to a predefined upper limit that is found to be stable for the structure. The cradle assembly 20 typically includes a number of wood or plank members to form a bunk assembly 24 that conforms substantially to the bottom of the water craft to be received thereon. Guides 26 attached at the corners of the cradle assembly engage the posts 14 to keep the cradle assembly in registered alignment and translate without binding.

Disposed at the upper end of the posts 16 and interconnected thereto is the upper frame assembly 28. The upper frame assembly sets the upper limit of travel of the cradle assembly 20 as well as provides stability and structure to the upper reaches of the posts 14. Attached to one of the upper frame assembly or one of the posts is a winch assembly 30. The winch assembly includes a plurality of cables passing over pulleys (not shown) and attached to the cradle assembly 20 to actuate the cradle assembly 20 so that is will raise and lower the water craft relative to the water surface. In a preferred embodiment of the invention, winch assembly 30 would be a brake winch having a centrifugal clutch or brake.

The boat lift structure described above can be quite large to accommodate boats of up to six-thousand pounds or more. As a consequence the structures are often made from metal, and often aluminum, and have weights on the order of many hundreds of pounds, making it difficult for one or two men to move the structure without some substantial leverage or assistance.

The instant invention is primarily intended to be used to transport the boat lift 10 such as shown in FIGS. 1 and 2 in and out of water. The invention is also intended to be used to easily transport and position the boat lift 10 when in the water. The invention may also be used to transport the boat lift over the road from one position to another such as from a storage location to the body of water where the boat lift is to be used.

FIG. 2 is a perspective view of the boat lift transport 32 designed to assist in the lifting and transport of boat lift 10 such as that described above. Referring to the figures, transport 32 includes at least one float or platform 34 of sufficient buoyancy and displacement to support the weight of the boat lift 10. In the particular embodiment depicted in FIG. 2, two such floats 34 are shown forming the platform 34 although it is contemplated that any number may be used in any number of configurations to provide the necessary lift. For example, in the embodiment shown in FIG. 2, the floats may be formed from blocks of closed-cell polystyrene. Pontoon floats may also be employed, made from fabric, aluminum, polymers, and the like. It is also contemplated that the platform 34 may be formed from barrels or other hollow containers that provide sufficient displacement to support the weight of the boat lift 10 in the water. Other forms of floats not described herein could also be used including single hull or barge designs.

Disposed on the floats 34 may be a plurality of cranes, booms or beams 36 that extend outboard of the floats 34. The cranes 36 are preferably fitted with cables 38 having one end adapted to be detachably coupled to the lower frame assembly 18 or other structure of the boat lift 10. The opposite ends of the cables 38 are preferably attached to one or more reels or other form of cable management system 40 to take up and pay out lengths of the cable sufficient to be attached to the boat lift 10 and to keep the cables from binding and crimping. An assembly for actuating the reel to pay-out and reel-in the cables from the ends of the crane arms may include one of a crank 42 or an electrically powered winch for heavier jobs. In the embodiment shown, a shaft 44 extends from one end of the transport across the fore and aft cranes, interconnecting a fore and aft reel for receiving the cables. The end of the shaft 44 is connected to the winch described earlier.

Figure 3:
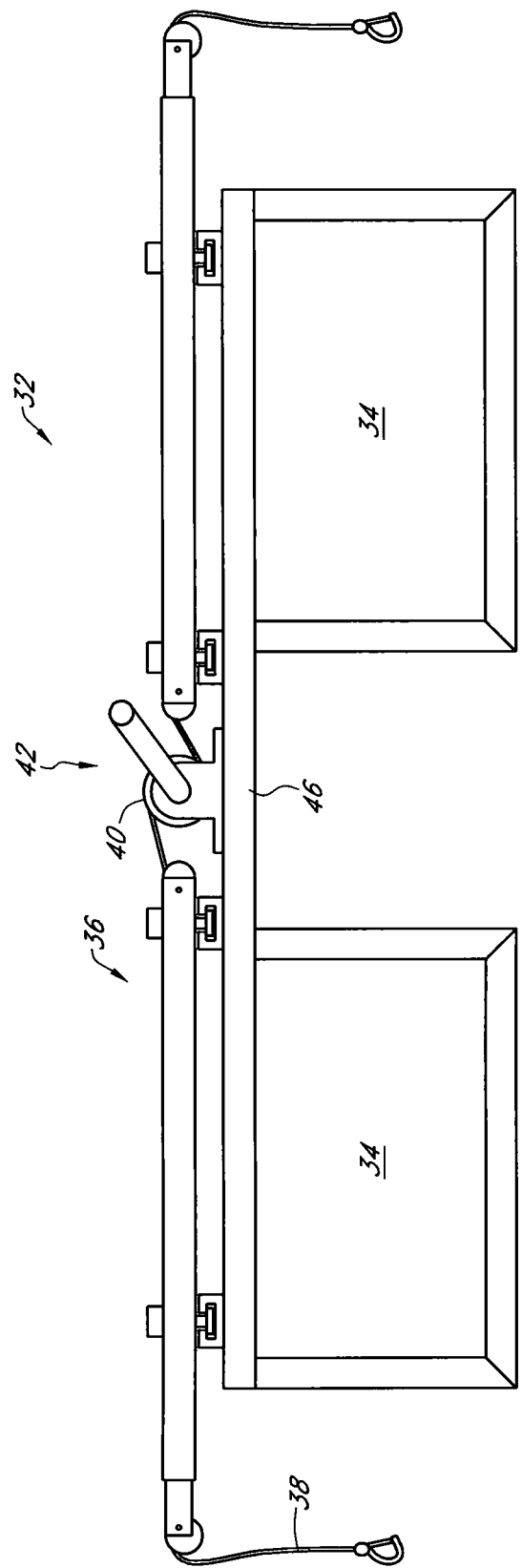
FIG. 3 is a schematic diagram of one embodiment of a lifting mechanism used in association with the invention.

It is contemplated in one embodiment of the invention that each of the cranes 36 may be configured so they can easily be translated relative to one another longitudinally along the length or long axis of the platform 34. For example, as shown in FIG. 3, it is contemplated that each crane 36 may be moveable along and attached to channels 37 formed in the upper surface of the platform. Suitable anchors extending transversely through the cranes and attached to T-nuts disposed within the channels 37 are contemplated to be suitable for permitting translation of the crane arms while similarly anchoring them in position. It is also contemplated that more sophisticated linkages may interconnect each of the crane arms to position and fix them in position. Such mechanisms may include rack and pinion gears and the like. It is also contemplated that the cranes 36 at the fore and aft ends of the transport 32 may also be pivotable about their inner attachment points so that the extent of the crane reach can be oriented pointing fore and aft of the invention to provide more flexibility in obtaining suitable attachment to the structure being carried.

It if further contemplated that each crane 36 may include telescopic sections using suitably strong materials so that the lateral reach of each may be adjusted so that the end of each crane 36 may generally be positioned above the lifting point of the shore station or boat lift 10. It is further contemplated that the length of each telescopic section be engineered and designed to handle the anticipated loads. The type of material as well as the wall thickness of the material, as well as other factors taken into consideration by an engineer in designing a stable telescopic section would be understood by one of skill in the art.

In one form of the invention, it is contemplated that the float or platform 34 includes a frame 46 to provide a rigid structure upon which the cranes 36 and other components may be mounted. For example, in the embodiment shown in FIG. 2, the frame 46 may be formed from aluminum angle to provide a structure within which the polystyrene blocks are nested and attached. Alternatively the frame may be formed to surround entire solid blocks or assemblies of floatation material. Although rectangular frames are depicted, the shape of the frame 46 is not limiting to the functionality of the invention. Other frame designs having cylindrical, circular, triangular, square and or diamond cross-sections may also be constructed to interconnect pontoons or other forms of floatation hulls.

Shown generally in FIG. 2 is a trailer assembly 47 upon which the transport is received when moving the boat lift 10 in and out of the water, or when transporting the boat lift from the water's edge to a storage location, and back again. The trailer assembly 47 is contemplated to include a frame similar in footprint to that of the frame 46 and dimensioned to receive and cradle the floats in a nested configuration when resting on the trailer assembly 47. The trailer may also include a standard axle assembly for the wheels 48 sufficient to carry the load of the transport as well as the boat lift being moved. The trailer tongue 50 may also be adapted so that it clears the lower frame assembly of the boat lift when the lift is being moved.

In another form of the invention, an assembly is provided for floating a partially submerged boat lift from the water, comprising a buoyant platform, a plurality of beams disposed upon and cantilevered outwardly from said platform, at least one reel mounted on said platform, a plurality of cables, each extending along one of said plurality of beams and having one end attachable to the boat lift and an opposite end attached to said at least one reel; and a mechanism for actuating said at least one reel to wind and unwind said plurality of cables. The buoyant platform may be comprised of a barge, a plurality of pontoons, a plurality of water-tight canisters interconnected to one another; polystyrene blocks; or a boat hull. The assembly may also include a trailer for receiving the buoyant platform when pulling the assembly and boat lift from the water.

It is further contemplated that the invention may be adjustable to accommodate different sized boat lifts. The adjustment may be accommodated in the positioning of the cranes fore and aft to distribute the load longitudinally along the floats. Other adjustments may be transverse, moving the crane arms to extend outwardly to accommodate wider or narrower boat lifts. Such adjustments in the adaptability of the transport may necessarily require more robust decks and frames so provide adequate support. Moreover it is contemplated that the routing of the cable to more closed systems may also be envisioned for aesthetics and functionality.

Figure 4:
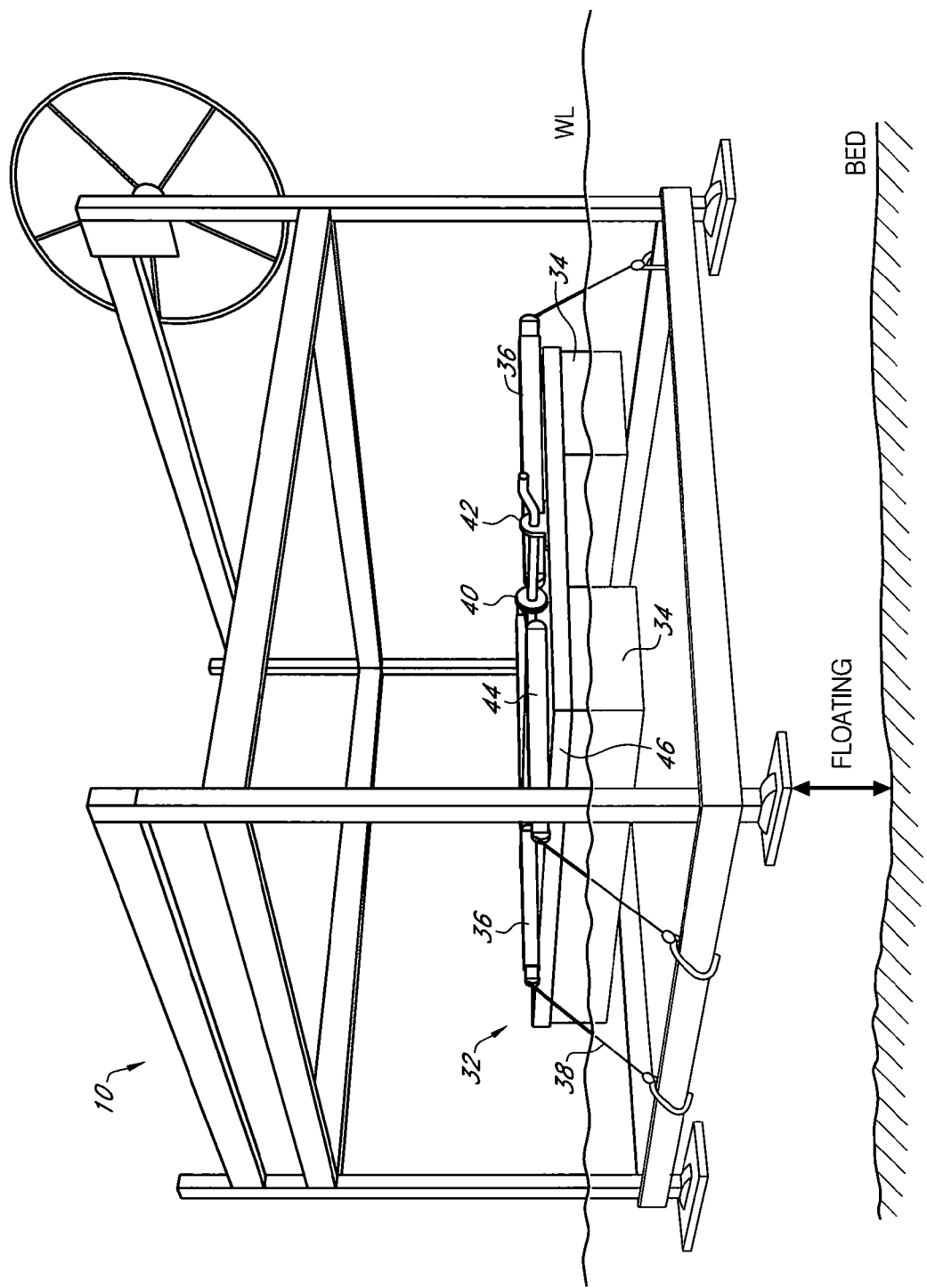
FIG. 4 is a schematic illustration of the inventions shown in FIGS. 2 and 3 in operation with the shore station shown in FIG. 1.

In operation and with reference to FIG. 4, the transport 32 is trailered to the shore of the body of water on the trailer assembly 47 which is partially submerged to permit the transport 32 to float on the surface of the water WL. The user may then tow or otherwise maneuver the transport 32 to the boat lift 10 that is to be moved. In a preferred method of operation, and to maximize the amount of lift possible so as to maneuver the shore station 10 into shallow water, the user elevates the cradle assembly well above the water line WL so that the transport 32 is able to float thereunder and centrally above the lower frame assembly 18. Once in position, the user is able to adjust the position of each of the cranes so that uniform lift (tension) can be applied to the submerged portion of the shore station. Once in position, sufficient lengths of the cable may be drawn off the reel so that the ends of the cables can be attached to positions uniformly along the rails forming the lower frame assembly. With the ends of the cable attached, the user can then actuate the winch system to draw or wind the cables about the reels, thus putting them in tension and lifting the boat lift from the bottom of the lake, stream, etc. In transport, the user may lower the shore station cradle assembly to keep the center of gravity of the lift as close to the deck of the transport 32 as possible so as to maximize stability and minimize the chance of the entire assembly capsizing. With the boat lift suspended from the transport 32, the user is then able to maneuver the transport 32 onto the trailer that is partially submerged in the water. With the transport secured, the user need only pull the trailer from the water to remove the boat lift for storage. The reverse steps are performed when placing and transporting the boat lift back to its temporary position in the water.

The different embodiments described herein are provided merely as examples of this practical new design and represent only the embodiments known to date by the inventors. Modifications of the invention could be made by those skilled in the art and to those who make or use the invention that would be considered within the scope of the invention. Therefore, it is understood that the embodiments shown in the drawings and described above are merely for illustrative purposes and not intended to limit the scope of the invention

The invention claimed is:

1. An assembly for transporting a boat lift in and out of a body of water, comprising:
   at least one float separate and apart from the boat lift;
   a plurality of cranes disposed on said at least one float and extending laterally outboard thereof;
   a plurality of cables disposed along said cranes, each of said cables having one end to be detachably coupled to the boat lift and an opposite end attached to a reel disposed on said at least one float; and
   an assembly for actuating said reel to pay-out and reel-in said plurality of cables along said cranes for the purposes of lifting or lowering said boat lift relative to the earth.

2. The assembly for transporting a boat lift in and out of a body of water as defined in claim 1, further comprising a frame separate and apart from said boat lift mounted to an upper surface of said at least one float for supporting said plurality of cranes on said at least one float.

3. The assembly for transporting a boat lift in and out of a body of water as defined in claim 1, wherein a resultant vertical force exerted on said at least one float by the body of water is greater than the mass of the boat lift plus the water displaced by said at least one float.

4. The assembly for transporting a boat lift in and out of a body of water as defined in claim 1, further comprising a trailer assembly for receiving said at least one float thereon for deploying and retrieving the assembly.

5. The assembly for transporting a boat lift in and out of a body of water as defined in claim 1, wherein said at least one float comprises a barge.

6. The assembly for transporting a boat lift in and out of a body of water as defined in claim 1, wherein said at least one float may be comprised of polystyrene.

7. The assembly for transporting a boat lift in and out of a body of water as defined in claim 1, wherein said at least one float comprises a plurality of pontoons.

8. The assembly for transporting a boat lift in and out of a body of water as defined in claim 1, wherein said at least one float comprises a plurality of interconnected cylinders.

9. The assembly for transporting a boat lift in and out of a body of water as defined in claim 1, further comprising fore and aft cranes.

10. The assembly for transporting a boat lift in and out of a body of water as defined in claim 1, further comprising at least one shaft attached to said reel.

11. An assembly for floating a submerged boat lift, comprising:
- a buoyant platform separate and apart from said boat lift;
- a plurality of beams cantilevered outboard from said buoyant platform;
- at least one reel mounted on said buoyant platform;
- a plurality of cables, each extending along one of said plurality of beams and having one end attachable to the boat lift and an opposite end attached to said at least one reel; and
- a mechanism for actuating said at least one reel to wind and unwind said plurality of cables to raise and lower the boat lift.

12. The assembly for floating a submerged boat lift as defined in claim 11, wherein said buoyant platform comprises one of a barge, a plurality of pontoons, a plurality of watertight canisters interconnected to one another; polystyrene blocks; and a boat hull.

13. The assembly for floating a submerged boat lift as defined in claim 11, further comprising a trailer for receiving said buoyant platform for pulling said assembly and boat lift from the water.

14. The assembly for floating a submerged boat lift as defined in claim 11, further comprising a plurality of pulleys disposed on said beams for receiving said cable therein.

15. The assembly for floating a submerged boat lift as defined in claim 11, wherein said at least one reel is mounted on a shaft interconnected to said mechanism for actuating said at least one reel.

16. The assembly for floating a submerged boat lift as defined in claim 11, further comprising a frame assembly interconnecting said plurality of beams to said buoyant platform.

17. The assembly for floating a submerged boat lift as defined in claim 11, further comprising a frame assembly atop said buoyant platform and interconnected to said plurality of beams.

18. The assembly for floating a submerged boat lift as defined in claim 11, wherein said plurality of beams comprise a fore and an aft beam disposed transversely to a longitudinal axis of said buoyant platform.

19. The assembly for floating a submerged boat lift as defined in claim 11, wherein said plurality of beams are translatable longitudinally along said buoyant platform.

20. An assembly for transporting a boat shore station in and out of the water, the boat shore station having at least a lower frame assembly, comprising
- a buoyant platform, separate and apart from the boat shore station, of a size to fit within a footprint of the boat shore station lower frame assembly and of a volume sufficient to displace the weight of the boat shore station in water;
- a plurality of beams cantilevered outwardly from said buoyant platform and extendable approximately above the lower frame assembly of the boat shore station, said plurality of beams translatable to a desired position longitudinally along said buoyant platform;
- at least one reel mounted on said buoyant platform, said reel including a ratchet mechanism;
- a plurality of cables, each extending along one of said plurality of beams and having one end attached to said at least one reel, and an opposite end free for attachment to the lower frame assembly of the boat shore station;
- a mechanism for actuating said at least one reel to wind and unwind said plurality of cables to raise and lower the boat shore station relative to the assembly; and
- a trailer for cradling said buoyant platform and transporting the boat shore station in and out of the water.

* * * * *